US011121595B2

(12) United States Patent
Ross et al.

(10) Patent No.: US 11,121,595 B2
(45) Date of Patent: *Sep. 14, 2021

(54) PERMANENT MAGNET ELECTRIC MACHINE WITH MOVEABLE FLUX-SHUNTING ELEMENTS

(71) Applicant: GM GLOBAL TECHNOLOGY OPERATIONS LLC, Detroit, MI (US)

(72) Inventors: Craig S. Ross, Ypsilanti, MI (US); Khwaja M. Rahman, Troy, MI (US); Goro Tamai, Bloomfield Hills, MI (US); Shawn H. Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/700,443

(22) Filed: Dec. 2, 2019

(65) Prior Publication Data

US 2020/0106316 A1 Apr. 2, 2020

Related U.S. Application Data

(63) Continuation of application No. 15/860,234, filed on Jan. 2, 2018, now Pat. No. 10,541,578.

(51) Int. Cl.
*H02K 1/27* (2006.01)
*H02K 1/28* (2006.01)
(Continued)

(52) U.S. Cl.
CPC .......... *H02K 1/2766* (2013.01); *H02K 1/246* (2013.01); *H02K 1/278* (2013.01); *H02K 1/2793* (2013.01);
(Continued)

(58) Field of Classification Search
CPC  H02K 1/24; H02K 1/246; H02K 1/27; H02K 1/276; H02K 1/2766; H02K 1/278;
(Continued)

(56) References Cited

U.S. PATENT DOCUMENTS 4,578,609 A * 3/1986 McCarty .............. H02K 21/028
310/156.24
5,679,087 A * 10/1997 Lutz ........................ B60K 1/02
475/149

(Continued)

*Primary Examiner* — Tran N Nguyen
(74) *Attorney, Agent, or Firm* — Quinn IP Law (57) ABSTRACT

A permanent magnet electric machine (PM machine) for a vehicle or other system includes a rotor assembly, fixed permanent magnets, a stator, an actuator, and one or more repositionable/moveable flux-shunting elements. The flux-shunting element is repositioned to control flux at specific operating points of the PM machine. The rotor assembly has a rotor coaxially surrounding and coupled to a rotor shaft. The permanent magnets are mounted to or in the rotor, and the moveable flux-shunting element is positioned between the rotor shaft and a respective one of the permanent magnets. Inboard and outboard ends of each respective permanent magnet may be oriented toward the rotor shaft and stator, respectively. The actuator selectively positions the moveable flux-shunting element at one or more operating points of the PM machine to vary reluctance in a magnetic circuit formed by the stator and rotor assembly.

20 Claims, 10 Drawing Sheets

(51) Int. Cl.
*H02K 15/03* (2006.01)
*H02K 1/24* (2006.01)
*H02K 7/116* (2006.01)
*H02K 16/02* (2006.01)
*H02K 21/02* (2006.01)

(52) U.S. Cl.
CPC .............. *H02K 1/28* (2013.01); *H02K 7/116* (2013.01); *H02K 15/03* (2013.01); *H02K 16/02* (2013.01); *H02K 21/028* (2013.01); *H02K 2201/09* (2013.01); *H02K 2213/09* (2013.01)

(58) Field of Classification Search
CPC ........ H02K 1/279; H02K 1/2793; H02K 1/28; H02K 21/00; H02K 21/02; H02K 21/028; H02K 7/00; H02K 7/11; H02K 7/116; H02K 16/00; H02K 16/02; H02K 15/00; H02K 15/03
See application file for complete search history.

(56) References Cited

U.S. PATENT DOCUMENTS

| | | | |
|---|---|---|---|
| 10,541,578 B2 * | 1/2020 | Swales | H02K 1/28 |
| 2013/0187504 A1 * | 7/2013 | Tanaka | H02K 1/2706 |
| | | | 310/156.01 |
| 2013/0300354 A1 * | 11/2013 | Ichikawa | H04L 67/12 |
| | | | 320/108 |

* cited by examiner

_Fig-1_

_Fig-3A_

PERMANENT MAGNET ELECTRIC MACHINE WITH MOVEABLE FLUX-SHUNTING ELEMENTS

CLAIM OF PRIORITY AND CROSS-REFERENCE TO RELATED APPLICATION

This application is a continuation of U.S. patent application Ser. No. 15/860,234, which was filed on Jan. 2, 2018, is now allowed, and is incorporated herein by reference in its entirety and for all purposes.

INTRODUCTION

Electric machines in the form of traction motors and electric generators are used to generate torque in a wide variety of electromechanical systems. Electric machines include a rotor that is concentrically positioned with respect to a stator, with the stator circumscribing the rotor. A rotor shaft rotates when the electric machine is energized by a high-voltage power supply, such as an inverter and a multi-cell battery pack. Torque transmitted by the rotor shaft may be used to perform work in the electro-mechanical system, such as by generating electricity, cranking and starting an engine, or propelling a vehicle.

In a permanent magnet-type electric machine, or "PM machine", rare earth permanent magnets are surface-mounted to or embedded within the structure of the rotor. The permanent magnets are arranged in an even number of alternating magnetic north/south poles around the circumference of the rotor. The stator defines multiple stator slots, with each of the stator slots being individually wound with conductive wires or bar conductors to form stator windings.

The stator windings are then sequentially energized by a polyphase input voltage to produce a rotating electromagnetic field. This rotating electromagnetic field interacts with the strong magnetic fields of the rotor's fixed permanent magnets. The forces of the magnetic field interaction ultimately rotate the rotor shaft and, thus, the connected rotor. External control of the input voltage delivered to the stator windings ultimately controls the amount of motor torque produced by the PM machine and the speed at which the rotor shaft rotates. PM machines tend to experience relatively high energy losses as a percentage of total useful power under high-speed/low-load operating conditions, with this loss effect due largely to the large fixed magnetic fields of the permanent magnets.

SUMMARY

A permanent magnet-type electric machine ("PM machine") is disclosed herein in which the permanent magnetic field of a set of permanent magnets of a rotor assembly linking to a rotating magnetic field of a surrounding stator is actively or passively controlled, in real-time, to selectively achieve an operating point-based flux-shunting effect. As used herein, "flux-shunting" refers to the purposeful direction of magnetic flux through a magnetic circuit formed of structure of the PM machine, specifically the permanent magnets and rotor material, due to selective variation in magnetic reluctance.

As used herein and in the art, "reluctance" refers to the obstruction offered by a magnetic circuit to magnetic flux, somewhat analogous to resistance in an electric circuit. Just as electric current tends to follow the path of least resistance in an electric circuit, magnetic flux will follow the path of least reluctance. Mathematically, reluctance (S) may be represented as a function of magnetic motive force (F) and magnetic flux ($\phi$):

$$S = \frac{F}{\phi}$$

The present approach automatically varies the reluctance in a magnetic circuit of the PM machine via position control of one or more flux-shunting elements at specific operating points of the PM machine.

More specifically, reluctance is varied within a designated region of the rotor nearest to an inboard/radial-innermost end of the above-described permanent magnets. To activate flux-shunting, moveable flux-shunting elements are located within the rotor and are position-adjusted at certain operating points of the PM machine. For instance, flux-shunting may be selectively activated above a threshold rotational speed and below a threshold torque of the rotor, thereby reducing field-related losses, with flux-shunting otherwise left inactive when flux is needed for torque generation.

Relative to the performance of an internal combustion engine, a PM machine is an efficient generator of torque under low-speed/high-torque conditions, such as when motor torque is directed to drive wheels of a motor vehicle to accelerate from a standstill. However, the efficiency of a PM machine decreases with increasing speed and decreasing motor torque. That is, high-speed/low-torque operating points may result in field-related losses that, if magnetic reluctance could be varied in a purposeful manner as enabled herein, would greatly benefit the performance of a vehicle or other system employing the PM machine. The disclosed approach is therefore intended to provide a possible solution to the above-described field loss phenomenon associated with PM machines without compromising the structural integrity and packaging requirements of the PM machine.

In an example embodiment, a PM machine includes a rotor assembly and a stator. The rotor assembly includes a rotor shaft, a rotor coaxially surrounding and coupled to the rotor shaft, a plurality of fixed permanent magnets, and a moveable flux-shunting element positioned in the rotor. The stator is positioned adjacent to the rotor to form a magnetic circuit. The PM machine is configured to selectively position the moveable flux-shunting element of the PM machine to vary reluctance in the magnetic circuit at one or more operating points of the PM machine.

Each of the permanent magnets may be mounted to the rotor and has an inboard end and an outboard end. The inboard and outboard ends of the respective permanent magnets are oriented toward the rotor shaft and the stator, respectively.

The moveable flux-shunting element in some embodiments is rotatable about an axis of rotation that is the same as or parallel to an axis of rotation of the rotor. In such an embodiment, the moveable flux-shunting element may include a plurality of moveable flux-shunting elements, each constructed of joined halves of first and second materials having different relative magnetic permeability values. The first material may be a non-magnetic or a paramagnetic material, and the second material may be a ferromagnetic material.

The rotor may define arcuate slots, and the moveable flux-shunting element includes axially-extending fingers that are rotatable within the arcuate slots of the rotor about an axis of rotation that is the same as the axis of rotation of the rotor.

Alternatively, the rotor may define radial slots, and the moveable flux-shunting element may translate within the radial slots toward the permanent magnets to close an air pocket between a respective one of the fixed permanent magnets and the flux-shunting element. The moveable flux-shunting element may also translate within the radial slots away from the respective permanent magnets to thereby open the air pocket between the respective permanent magnets and the flux-shunting element.

A rotatable cam plate may be used in some embodiments. The cam plate defines arcuate through-slots, with the moveable flux-shunting element including a plurality of moveable flux-shunting elements. The cam plate is rotatable by an actuator to translate the flux-shunting elements with respect to an axis of rotation of the rotor within a respective one of the radial slots of the rotor. Rotation of the cam plate translates the flux-shunting elements via contact between a respective one of the arcuate through-slots and a respective one of the moveable flux-shunting elements.

The rotor may be segmented into alternating first and second rotor segments, with the moveable flux-shunting element having alternating first and second flux-shunting segments of different geometries or shapes. Translation of the moveable flux-shunting element in one axial direction aligns the first and second flux-shunting segments with the first and second rotor segments, respectively, and translation of the moveable flux-shunting element in another axial direction aligns the first and second flux-shunting segments with the second and first rotor segments, respectively.

An actuator and a controller may be placed in communication with each other, with the actuator configured to move the moveable flux-shunting element in response to a control signal from the controller.

The actuator may be optionally embodied as a passive actuator configured to bias the moveable flux-shunting element in a first rotational direction below a threshold acceleration force of the rotor, and to permit movement of the moveable flux-shunting element in a second rotational direction above the threshold acceleration force.

In some embodiments, the actuator is configured to balance forces due to centripetal acceleration, magnetic forces on the flux-shunting elements, and a spring force applied to the flux-shunting elements by the passive actuator to thereby passively position the flux-shunting to thereby passively position the flux-shunting elements, such that flux-shunting is active at high-speed and low-torque, and inactive elsewhere.

The flux-shunting elements are subject to forces as a result of the flux field surrounding or passing through them. These forces resolve to net forces and/or torques, which tend to displace the flux-shunting elements. The magnitude of these forces is a function of the currents applied in the stator windings. For example, the tendency of the flux-shunting element to be displaced to the "fully-shunted" position may be strongest in the absence of stator current. As the stator current increases, the forces or torques tending to move the flux-shunting element to the "fully-shunted" position may be reduced.

In particular, the direct-axis (d-axis) current and the quadrature-axis (q-axis) current may have different effects on the forces acting on the flux-shunting elements. Passive actuation may be used to exploit this fact. By appropriately balancing forces due to centripetal acceleration, magnetic forces on the flux-shunting elements, and an applied spring forces, the actuator may be able to passively position the flux-shunting elements such that flux-shunting is active at high-speed and low-torque, and inactive elsewhere. This arrangement may also be employed to reduce the required capability of an active actuator in the event actuation cannot be rendered fully passive.

The moveable flux-shunting element may include a plurality of moveable flux-shunting elements, each of which is mounted to or formed integrally with a respective one of the rotatable torque transfer elements.

A gear set having rotatable pinion gears may be engaged with a sun gear, with each of the pinion gears connected to or formed integrally with a respective one of the torque transfer elements. An actuator, in this embodiment, is configured to rotate the sun gear.

A vehicle is also disclosed herein that includes drive wheels, a transmission having an input member and an output member, with the output member connected to the drive wheels, and a PM machine coupled to the input member. The PM machine may be configured to deliver motor torque to the input member, and includes a rotor assembly having a rotor shaft, a rotor coaxially surrounding and coupled to the rotor shaft, a plurality of fixed permanent magnets each of which is mounted to the rotor and has a respective inboard end and outboard end, and a moveable flux-shunting element positioned in the rotor. The PM machine further includes a stator circumscribing the rotor assembly to form a magnetic circuit therewith. The inboard and outboard ends of each respective permanent magnet are oriented toward the rotor shaft and the stator, respectively. An actuator may be configured to selectively position the moveable flux-shunting element of the PM machine to thereby vary reluctance in the magnetic circuit at one or more speed and torque operating points of the PM machine.

The above-noted and other features and advantages of the present disclosure will be readily apparent from the following detailed description of the embodiments and best modes for carrying out the disclosure when taken in connection with the accompanying drawings and appended claims.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, sub-combinations, permutations, groupings, and alternatives falling within the scope and spirit of the disclosure as defined by the appended claims.

DETAILED DESCRIPTION

Figure 1:
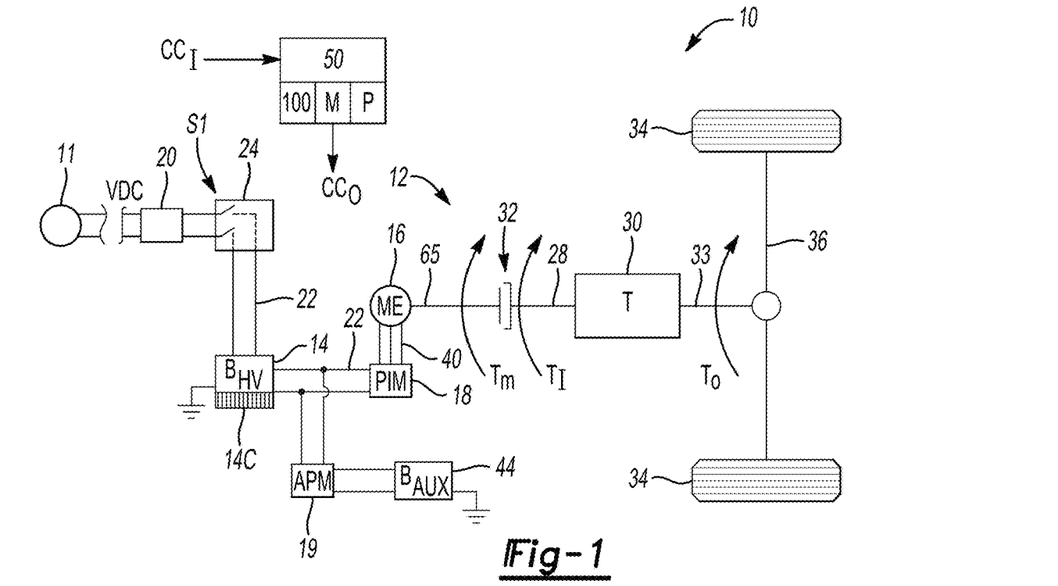
FIG. 1 is a schematic illustration of an example vehicle having a permanent magnet-type electric machine ("PM machine") with selectively repositionable flux-shunting elements as set forth herein.

Referring to the drawings, wherein like reference numbers refer to like components, FIG. 1 depicts an example motor vehicle 10 having an electric powertrain 12. The electric powertrain 12 includes a high-voltage battery pack (BO 14 having a plurality of battery cells 14C. The battery pack 14 is electrically connected to a permanent magnetic-type electric machine (ME) 16, also referred to herein as the PM machine 16, constructed with variable reluctance/flux-shunting capabilities as set forth below with reference to FIGS. 3A-12D. In certain embodiments, the PM machine 16 may be used as an electric traction motor aboard the motor vehicle 10 to generate motor torque (arrow $T_m$) at a level sufficient for propelling the vehicle 10, as an electrical generator, and/or for performing other useful work.

Applications of the PM machine 16 are not limited to mobile or vehicular applications in general, or to motor vehicle propulsion applications in particular. Those of ordinary skill in the art will appreciate that the attendant benefits of the disclosed PM machine 16 when constructed as described below may be extended to stationary and mobile applications that rely on the use of the motor torque (arrow $T_m$), particularly under high-speed/low-torque operating conditions of the PM machine 16.

Figure 2:
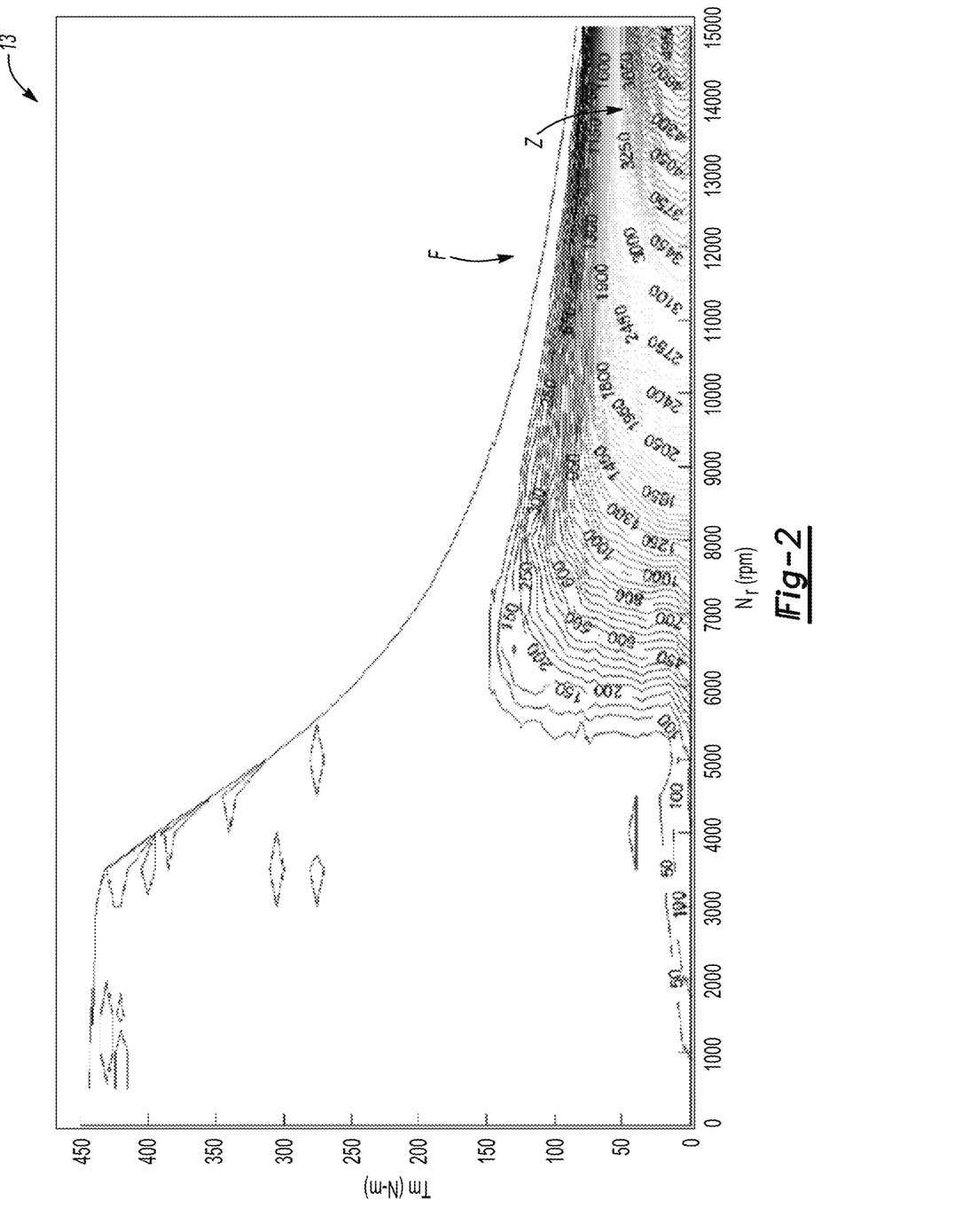
FIG. 2 is an example motor speed-torque-flux plot, with motor torque and flux depicted on the vertical axes and motor speed depicted on the horizontal axis.

As a foundational basis for the present disclosure, and referring briefly to the example operating plot 13 of FIG. 2, it is recognized herein that PM machines such as the PM machine 16 of FIG. 1 typically experience relatively high field-related losses as a percentage of useful power when operated at high motor rotational speeds ($N_r$) and low loads or motor torques (Tm), with the motor rotational speed ($N_r$) depicted on the horizontal axis and stated in revolutions per minute (rpm) and motor torque (Tm) depicted on the left-side vertical axis and stated in Newton-meters (N-m). Contour lines (arrow F) are numbered to show relative system loss by the application of the present shunting disclosure in the respective regions. A representative excess flux operating zone is generally indicated at Z in FIG. 2, with the values in FIG. 2 being illustrative of one possible configuration.

Zone (Z) illustrates the flux levels from relatively large fixed magnetic fields emanating from permanent magnets of the type used in a typical PM machine, e.g., large rectangular bar magnets embedded in opposing V-shaped slots to form north-south poles around a circumference of a rotor assembly of such a PM machine. A magnetic circuit thus exists between rotor and stator of a typical PM machine, across small air pockets between the rotor and stator, and across small air pockets between the permanent magnets of the rotor and the surrounding core material. Magnetic flux may be generated in excess when, as in zone (Z) of FIG. 2, the generated magnetic flux is not desirable due to DC bus voltage limitations. The present approach thus varies the flux paths or selectively "shunts" magnetic flux in the magnetic circuit in a targeted manner by varying reluctance at specific operating points of the PM machine 16.

Figure 3A:
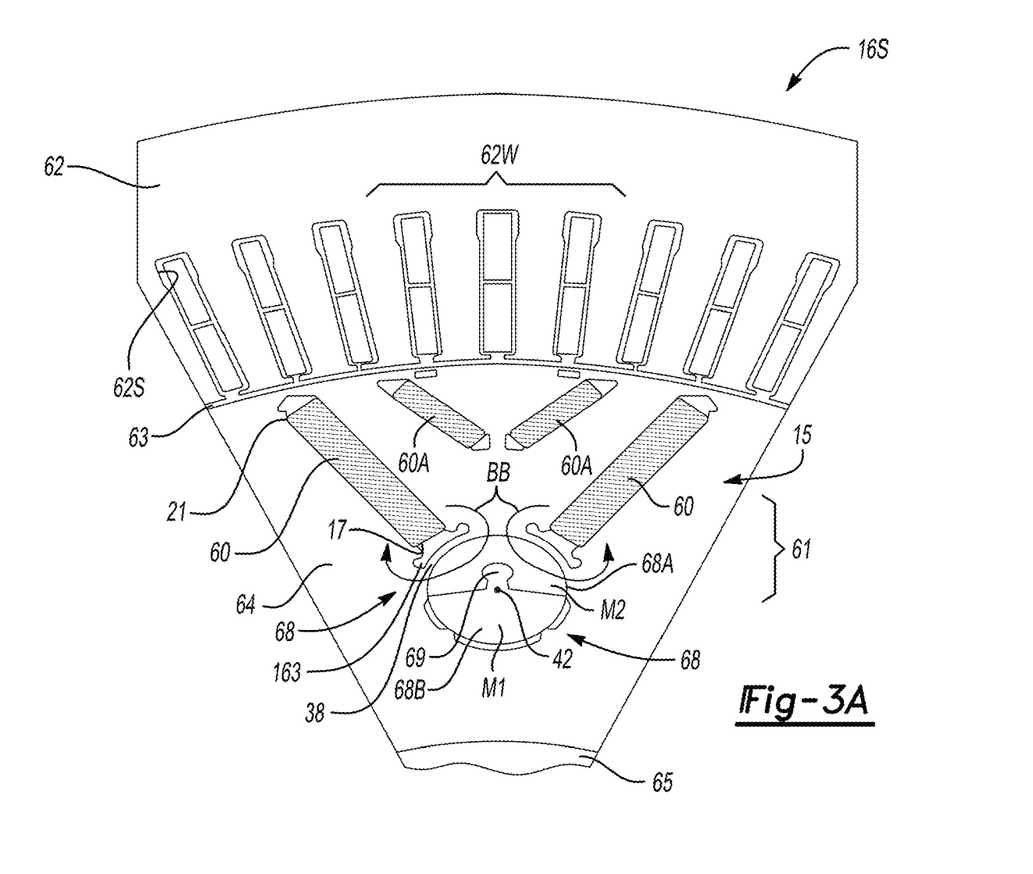
FIGS. 3A and 3B are schematic plan view illustrations of a portion of a rotor usable with the PM machine of FIG. 1 according to an example configuration in which rotatable flux-shunting elements are used to vary magnetic reluctance in a designated region of the rotor.

The PM machine 16 of FIG. 1 is configured with variable flux-shunting capabilities that are intended to improve the operating efficiency of the PM machine 16, specifically by varying the magnetic reluctance at an inboard end 17 of a set of permanent magnets 60 of the PM machine 16, as shown in FIG. 3A, when magnetic flux is not otherwise needed for generating the motor torque (arrow $T_m$). This goal is accomplished by moving, i.e., selectively varying an axial, radial, and/or angular position of, specially-configured flux-shunting elements of the PM machine 16 of FIG. 1, which in turn modifies the magnetic flux paths at the inboard ends 17 in real-time. Different embodiments for achieving such variable flux-shunting are depicted in FIGS. 3A-12D and described in detail below.

Further with respect to the example vehicle 10 shown in FIG. 1, the battery pack 14 may be optionally recharged via an offboard charging station 11, for instance a direct current (DC) fast-charging station as shown, with the charge possibly delivered directly to the battery pack 14 using an applied DC voltage (VDC) via a charge coupling device 20, to a DC voltage bus 22 via a voltage regulator 24 having one or more internal semiconductor and/or mechanical switches 51, or via an available alternating current charging system (not shown).

The electric powertrain 12 also includes a power inverter module (PIM) 18 that is electrically connected to the battery pack 14 via the DC voltage bus 22. Internal semiconductor switches (not shown) of the PIM 18 are automatically controlled via pulse width modulation or other desired switching techniques in order to generate an alternating current (AC) output voltage suitable for energizing the PM machine 16. An AC voltage bus 40 is used to electrically connect the PIM 18 to the individual phase windings of the PM machine 16. A DC-to-DC voltage converter/auxiliary power module (APM) 19 may be used to reduce a voltage level of the DC voltage bus 22 to a lower auxiliary level, e.g., 12-15 VDC, which in turn may be stored in an auxiliary battery ($B_{AUX}$) 44 for use in energizing low-voltage electrical systems aboard the vehicle 10.

A rotor shaft 65 of the PM machine 16 may be selectively connected to a load, e.g., an input member 28 of a transmission (T) 30, via operation of an input clutch 32. The rotor shaft 65 rotates and thereby delivers input torque (arrow Ti) to the input member 28 when the PM machine 16 is operated as an electric traction motor, and/or the PM machine 16 may be operated as a generator as needed. The motor torque (arrow $T_m$) from the energized PM machine 16 may be directed to the input member 28 and/or to another load in the form of an output member 33 of the transmission 30 and a set of drive wheels 34 connected to the output member 33 depending on the configuration of the electric powertrain 12. Output torque (arrow $T_O$) from the transmission 30 may be transmitted to the drive wheels 34 via one or more drive axles 36.

An optional controller 50 may be used to control ongoing operation of the PM machine 16 responsive to input signals (arrow $CC_I$), doing so via transmission of control signals (arrow $CC_O$) to the PM machine 16. For example, the controller 50 may monitor rotational speed and torque of the PM machine 16 and actively control the flux-shunting operation described herein at certain torque-speed operating points or as otherwise needed to fine tune the performance of the PM machine 16. The controller 50 may be embodied as one or more electronic control units having the requisite memory (M) and a processor (P), as well as other associated hardware and software, e.g., a clock or timer, input/output circuitry, etc. Memory (M) may include sufficient amounts of read only memory, for instance magnetic or optical memory. Instructions embodying a control method may be programmed as computer-readable instructions 100 into the memory (M) and executed by the processor(s) (P) during operation of the vehicle 10 to thereby optimize operating efficiency.

Figure 3B:
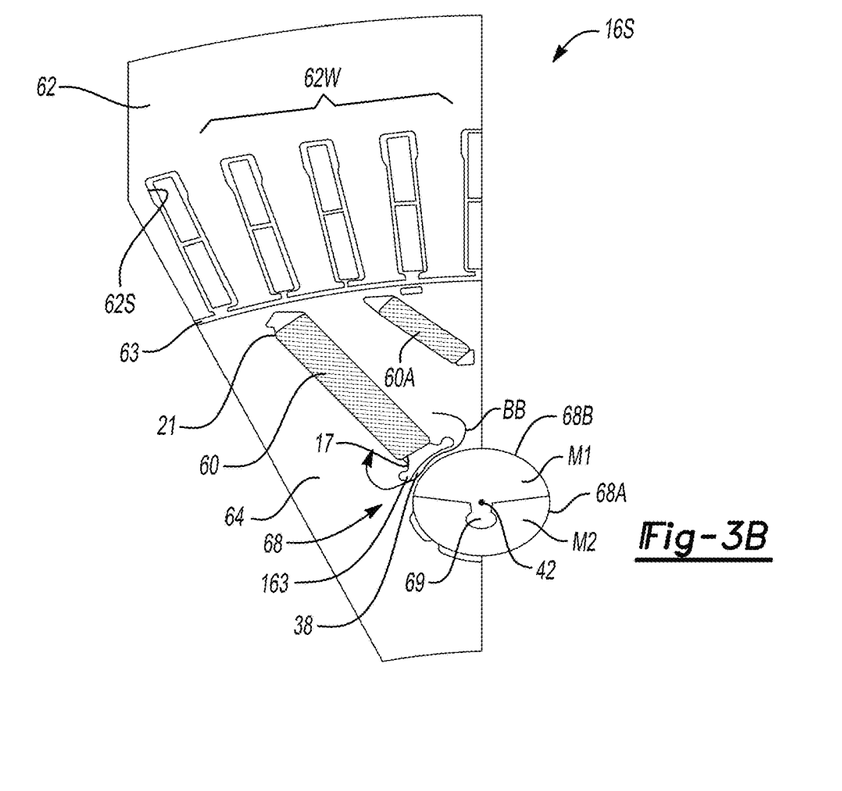

FIGS. 3A and 3B depicts a possible embodiment of the PM machine 16 of FIG. 1, with one PM machine segment 16S having a pole 15. As is known in the art, an even number of the poles 15 is used in a PM machine such as the PM machine 16 shown in FIG. 1, e.g., four or eight such poles 15 in various embodiments. The PM machine 16 has a rotor assembly 61, i.e., a generally cylindrical rotor 64 that is splined or otherwise mounted to, or formed integrally with, a rotor shaft 65. A portion of the rotor shaft 65 is shown adjacent to the rotor 64 for simplicity in FIGS. 3A and 3B, and in full in FIGS. 4 and 8. The rotor assembly 61 in the pictured embodiment is disposed radially inward of a stator 62, with the stator 62 defining stator slots 62S filled with stator windings 62W, i.e., bar conductors or wires. The stator 62 is separated from a rotor assembly 61 by a small air pocket 63, as is known in the art. However, other embodiments may be envisioned, such as axial-gap configuration in which the stator 62 is positioned adjacent to the rotor assembly 61 such that the air pocket 63 extends between the rotor assembly 61 and stator 62 in an axial direction. For illustrative consistency, a radial-gap configuration is described hereinafter without limiting the disclosure to such embodiments.

The pole 15 is formed of fixed permanent magnets 60, e.g., flat bar magnets arranged in a V-shape that opens from an inboard end 17 of the permanent magnets 60 radially outward toward a stator 62. An additional set of permanent magnets 60A may be positioned between the fixed permanent magnets 60 and the stator 62 in some embodiments. A respective outboard end 21 of each of the permanent magnets 60 is located in closer proximity to the stator 62 than is the inboard end 17, i.e., the inboard end 17 is "inboard" in the sense that the inboard end 17 is closer to the rotor shaft 65 than the outboard end 21.

As noted above, the rotor assembly 61 may be substantially cylindrical in its shape, i.e., generally circular in cross-section and thus forming a right cylinder with respect to an axis of rotation of the rotor assembly 61, with possible variations due to manufacturing tolerances, surface features, and connected components. The stator 62 axially surrounds and thus fully circumscribes the rotor assembly 61, and is separated from the rotor assembly 61 by the air pocket 63 noted above. Similarly, a small air pocket 163 is defined by the rotor 64 adjacent to the inboard end 17 of the permanent magnets 60, with the air pocket 163 bounded by the permanent magnets 60 and a thin bridge 38 constructed of the magnetically permeable material forming the rotor 64, e.g., mild steel. That is, the bridge 38 is a thin portion of the rotor 64, and thus is an integral part of the rotor 64.

The rotor 64 in the various embodiments disclosed herein includes a plurality of moveable flux-shunting elements 68. In the non-limiting embodiment of FIGS. 3A and 3B, the flux-shunting elements 68 are generally circular and rotatable about an axis of rotation 42 that is parallel to the axis of rotation 66 of the rotor shaft 65 (see FIG. 4). Rotation of the flux-shunting elements 68, which may occur actively by operation of the controller 50 or passively by operation of acceleration forces present in the PM machine 16 of FIG. 1, changes flux paths BB between the flux-shunting elements 68, the permanent magnets 60, and the rotor 64, particularly at the inboard ends 17 of the permanent magnets 60.

In the depicted example embodiment of FIGS. 3A and 3B, the flux-shunting elements 68 are substantially circular and are constructed of mating halves 68A and 68B. The mating halves 68A and 68B may be respectively constructed of first and second materials M1 and M2 with different magnetic permeability characteristics. That is, with a vacuum having a relative permeability ($\mu_R$) of 1, the relative permeability of the first material M1 may be a diamagnetic ($\mu_R < 1$) or non-magnetic/paramagnetic ($\mu_R \cong 1$) material such as aluminum, copper, and/or plastic. The second material M2 may be a ferromagnetic material, i.e., $\mu_R \gg 1$, such as mild steel or iron. The flux-shunting elements 68 may be optionally constructed, for instance, of extrusions of the first and second materials M1 and M2, and may possibly incorporate an interlocking feature 69 to help maintain structural integrity across the disparate mating halves 68A and 68B.

FIG. 3A depicts a possible orientation of the flux-shunting element 68 when flux-shunting is active. The orientations would alternate around the circumference of the rotor 64 for the non-illustrated poles 15. That is, the flux-shunting element 68 is rotated so that the second material M2, i.e., the ferromagnetic side of the flux-shunting element 68, is oriented toward the inboard end 17 of the permanent magnets 60 for the particular illustrated pole 15. Magnetic flux can pass through the second material M2 from the inboard end 17. In other words, a relatively large area of magnetically permeable material is presented to the inboard end 17 of the permanent magnet 60 by virtue of second material M2, and thus a relatively strong flux-shunting response is seen in the flux paths BB through the flux-shunting element 68.

In contrast, FIG. 3B depicts the positioning of the flux-shunting element 68 when flux-shunting is inactive. The flux-shunting element 68 is rotated relative to the position shown in FIG. 3A such that the relatively impermeable first material M1 is now oriented toward the inboard ends 17 of the permanent magnets 60. Orientation as shown in FIG. 3B thus presents high reluctance flux paths BB relative to the paths depicted in FIG. 3A, as the magnetic flux passes through the thin bridge 38 rather than through the relatively impermeable first material M1. In other words, in a manner analogous to electric current, magnetic flux finds the path of least resistance in a given magnetic circuit, with such a path in FIG. 3B being across the thin bridge 38. This thin bridge 38, however, quickly gets saturated by a small magnetic field and thus presents high reluctance to the magnetic circuit. So, in the depicted orientation, flux shunting is mostly inactive. The thin bridge 38 is needed for mechanical integrity of the rotor 64.

Figure 4:
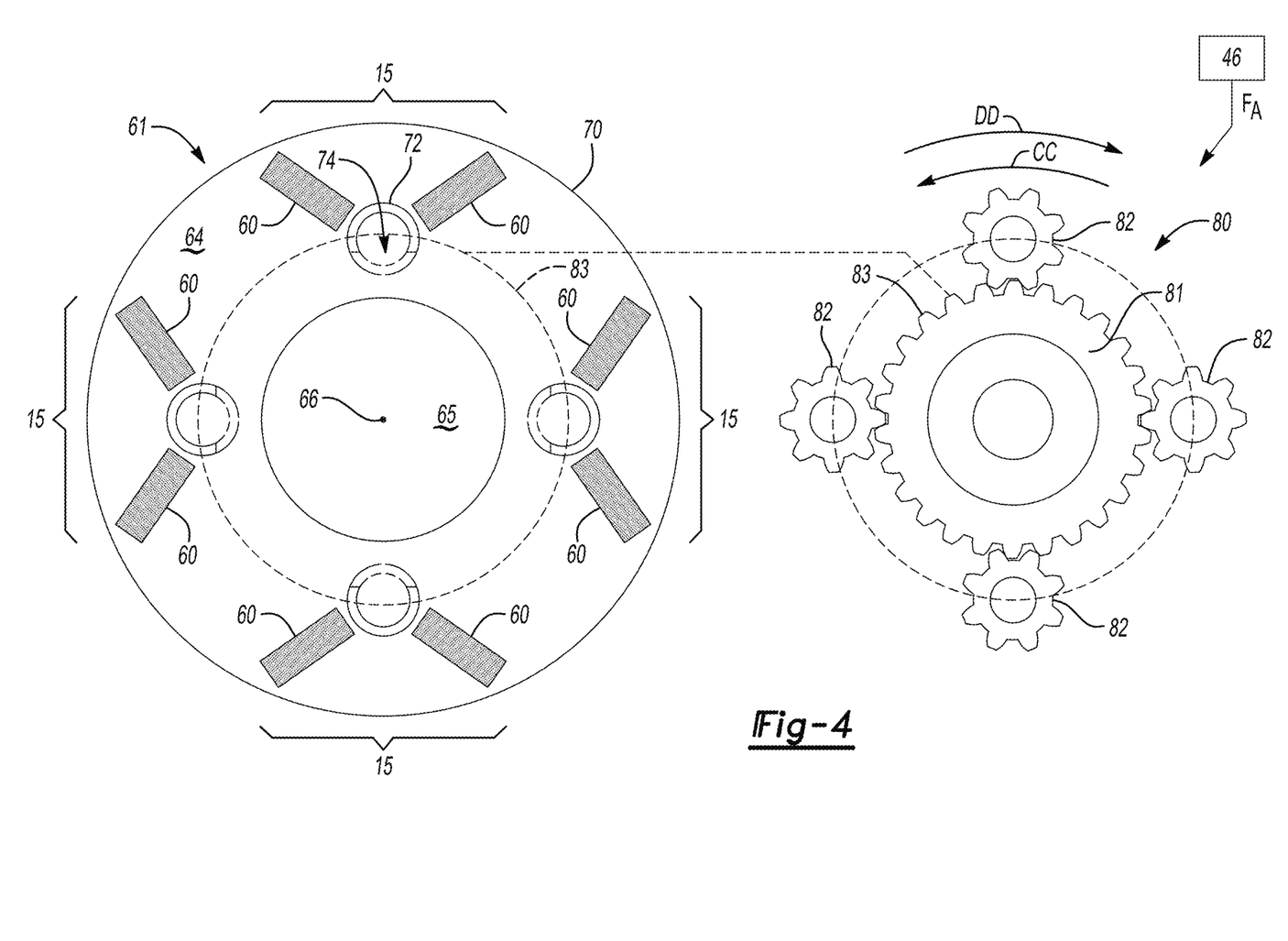
FIG. 4 is a schematic plan view illustration of the rotor assembly and a gear set usable for repositioning the magnetic flux-shunting elements shown in FIGS. 3A and 3B.

FIG. 4 depicts a possible embodiment for positioning the flux-shunting elements 68 of FIGS. 3A and 3B. A respective pole 15 of the permanent magnets 60 may be positioned adjacent to a perimeter wall 70 of the rotor 64, with the rotor shaft 65 and its axis of rotation 66 also depicted. For illustrative simplicity, four poles 15 of the permanent magnets 60 are shown. As is well known in the art and noted elsewhere above, the magnetic poles of a PM machine such as the PM machine 16 of FIG. 1 are distributed evenly around the circumference of the rotor 64, i.e., there are an equal number of alternating north and south magnetic poles. As the rotor assembly 61 rotates about the axis of rotation 66 past a fixed point on the stator 62, such a point will therefore experience alternating north and south poles to establish the requisite rotational forces.

The PM machine 16 includes an actuator 46 as shown schematically in FIG. 4, such as an active or passive rotary or linear actuator depending on the embodiment. The actuator 46 ultimately imparts an actuating force (arrow $F_A$), whether as a linear force that is translated into rotational motion or a rotary force/torque, to the flux-shunting elements 68 of FIGS. 3A and 3B to cause the flux-shunting elements 68 to rotate in a particular direction. The actuator 46 may apply the actuating force (arrow $F_A$) actively or passively in the different embodiments set forth below, and is configured to selectively rotate the flux-shunting elements 68 at one or more operating points of the PM machine 16 through an angular distance sufficient for changing the above-noted orientations of the respective first and second materials M1 and M2 of FIGS. 3A and 3B.

As an example application within the vehicle 10 of FIG. 1, for instance, magnetic flux may be reduced via rotation of the flux-shunting elements 68 at a high speed and low torque of the PM machine 16, e.g., when operating in the high-flux zone Z of FIG. 2. In terms of actuation, the optional controller 50 of FIG. 1 may determine the speed and torque of the PM machine 16, such as via calculation, measurement, or lookup table, and then command the actuator 46 of FIG. 4 to rotate the flux-shunting elements 68 when a threshold operating point is detected, e.g., when speeds of the rotor shaft 65 are higher than a threshold speed and motor torque of the rotor shaft 65 is lower than a threshold torque.

Alternatively, the actuator 46 may be configured as a partially or fully passive actuator, or in other words, to provide passive actuation with reduced levels of communication with the controller 50. In such an embodiment, the actuator 46 may passively bias the flux-shunting elements 68 in a first predetermined rotational direction below a threshold acceleration force of the rotor assembly 61, and enable rotation of the flux-shunting elements 68 in a second predetermined rotational direction when acceleration forces of the rotor assembly 61 exceed the biasing force.

In addition to the acceleration/centrifugal forces acting on the flux-shunting elements 68, the flux-shunting elements 68 are also subject to forces as a result of the flux field surrounding or passing through them. These forces resolve to net forces and/or torques which tend to displace the flux-shunting elements 68, and have a magnitude that is a function of the currents applied in the stator windings 62W of FIGS. 3A and 3B. For example, the tendency of the flux-shunting elements 68 to be displaced to the "fully-shunted" position may be strongest in the absence of stator current. As the stator current increases, the forces or torques tending to move the flux-shunting element 68 to the "fully-shunted" position may be reduced.

In particular, direct-axis (d-axis) current and quadrature (q-axis) current, as those terms are known in the art, may have different effects on the forces acting on the flux-shunting elements 68. Passive actuation may be used to exploit this fact. By appropriately balancing forces due to centripetal acceleration, magnetic forces on the flux-shunting elements, and an applied spring force to the flux-shunting elements 68, the actuator 46 may be able to passively position the flux-shunting elements 68 such that flux-shunting is active at high-speed and low-torque, and inactive elsewhere. This arrangement may also be employed to reduce the required capability of an active actuator in the event actuation cannot be rendered fully passive.

In the example embodiment of FIG. 4, a plurality of torque transfer elements 72 such as arcuate pieces, plates, or other suitable structure may be disposed within circular openings 74 defined in the material of the rotor 64. The torque transfer elements 72 may be securely connected to or formed integrally with a respective one of the torque transfer elements 72 and/or flux-shunting elements 68, such that rotation of the torque transfer elements 72 within the circular openings 74 is sufficient to rotate the flux-shunting elements 68 that are connected thereto.

A planetary gear set 80 disposed axially adjacent to the rotor 64 may be used to rotate the torque transfer elements 72 in response to the actuation force (arrow $F_A$) imparted to the gear set 80 by the actuator 46. The gear set 80 may include a sun gear 81 and multiple pinion gears 82 arranged evenly around the sun gear 81, i.e., an imaginary circle 88 passes through the respective center points of the various pinion gears 82. The sun gear 81 may be rotatably driven by the actuator 46 in some embodiments. Rotation of the sun gear 81 in the direction of arrow CC would thus rotate the pinion gears 82 in the opposite direction of arrow DD. In other embodiments, the actuator 46 may be a coil spring assembly (not shown) that rotationally biases the sun gear 81 in one rotational direction until the return/spring force is overcome by acceleration forces of the rotor 64.

Figure 5A:
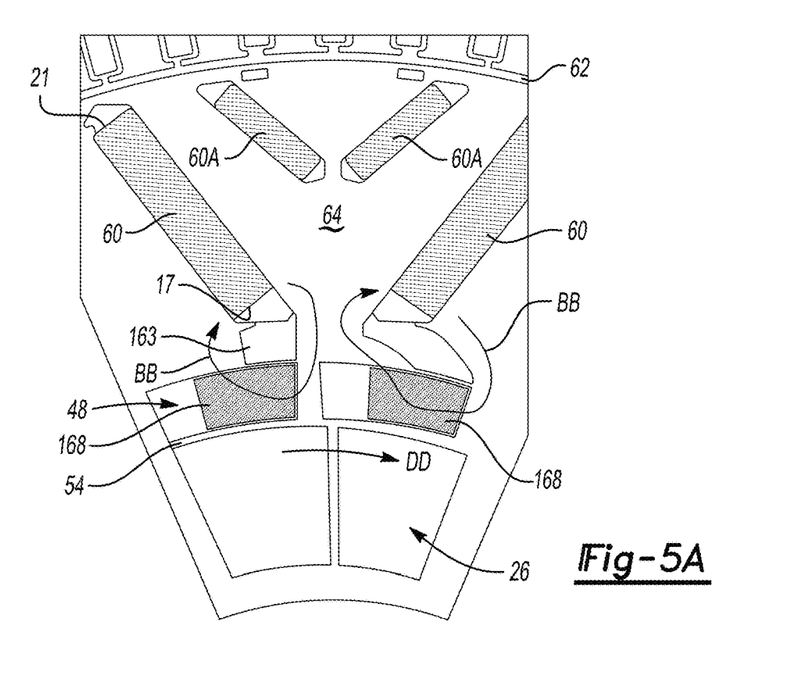
FIGS. 5A and 5B are schematic plan view illustrations of a portion of a rotor showing an example pole and another possible embodiment of the flux-shunting elements noted above, with the flux-shunting elements embodied as axial fingers of a coaxial rotatable element that simultaneously controls flux-shunting of the poles of the rotor.
Figure 5B:
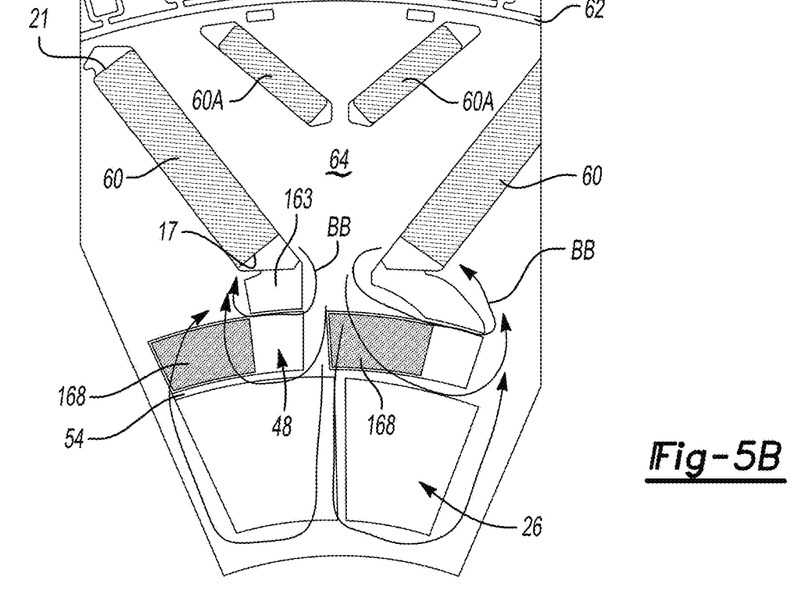

FIGS. 5A and 5B depict alternative flux-shunting elements 168 that are rotated within arcuate slots 48 of the rotor 64, with rotation being about the axis of rotation 66 of FIG. 4 in this particular embodiment. An air pocket 163 exists between the flux-shunting elements 168 and the inboard end 17 of the adjacent permanent magnets 60. An air cavity 26 may be present radially inward of the arcuate slots 48 in some configurations. The flux-shunting elements 168 may be optionally configured as axial fingers of coaxial rotatable element 52 (see FIGS. 7 and 8). Thus, rotation of the coaxial rotatable element 52, e.g., from one end of the rotor 64, results in rotation of the flux-shunting elements 168 in the arcuate slots 48 in the direction of arrow DD. Strong flux paths BB result in the configuration of FIG. 5A by movement of the flux-shunting elements 168 at the indicated location, i.e., magnetic flux passes from the permanent magnets 60, through the rotor 64 around the air pocket 163, through the flux-shunting element 168, and back to the permanent magnets 60.

Rotation of the flux-shunting elements 168 in the direction indicated by arrows CC in FIG. 5B results in inactive flux-shunting. That is, the size of the air pocket 163 effectively increases relative to FIG. 5A as the flux-shunting elements 168 move away from the inboard ends 17 of the permanent magnets 60, i.e., the rotation opens the arcuate slots 48 adjacent to the inboard ends 17. The flux path BB in FIG. 5B is thus from the permanent magnets 60, through the relatively thin bridges 54 of the rotor 64, to the flux-shunting elements 168, and back to the permanent magnets 60, as well as around the optional air cavity 26 located between the arcuate slots 48 and the rotor shaft 65 (not shown). Thus, a high reluctance path results when flux shunting is inactive.

Figure 6:
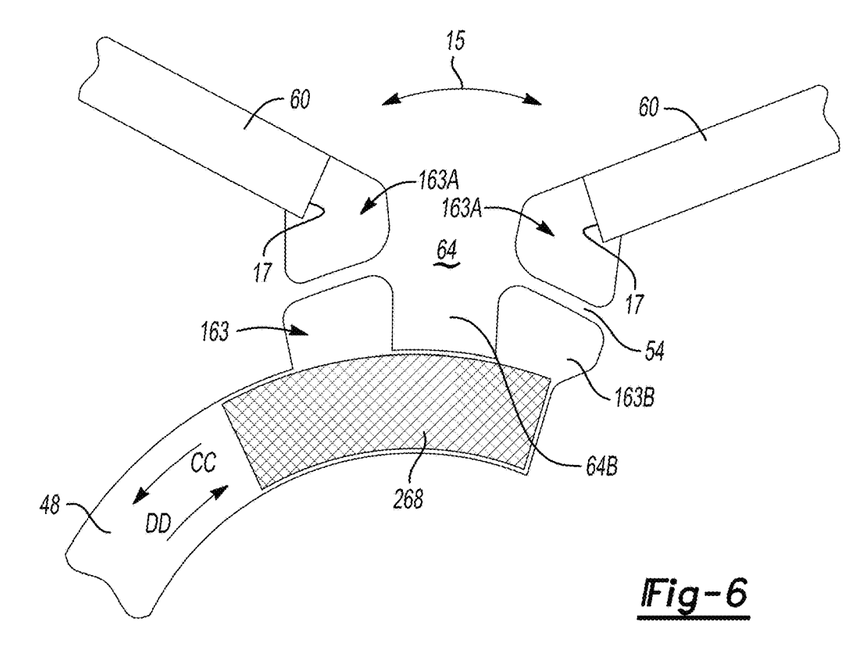
FIG. 6 is a schematic plan view illustration of a portion of the rotor showing another possible embodiment of the flux-shunting elements noted above.

FIG. 6 illustrates an alternative embodiment to that which is depicted in FIGS. 5A and 5B in which the arcuate slots 48 are coextensive with a given one of the poles 15, as opposed to having a separate arcuate slot 48 for each permanent magnet 60 as shown in FIGS. 5A and 5B. Rotation of flux-shunting elements 268 may be accomplished in the manner of the above-described flux-shunting elements 168, i.e., via the coaxial rotatable element 52 of FIGS. 7 and 8. However, an air pocket 163A between the inboard ends 17 of the permanent magnets 60 is divided by the bridge 54 into separate air pockets 163A and 163B. Rotation in the direction of arrow DD moves the flux-shunting elements 268 into the indicated position directly adjacent to the air pockets 163B. As a result, flux paths BB exist from the permanent magnets 60, through the rotor 64 and the flux-shunting elements 268, and back to the permanent magnets 60 via the rotor 64 (not shown). Rotation of the flux-shunting elements 268 in the direction of arrow CC ultimately moves the flux-shunting elements 268 away from the inboard ends 17, such that flux paths (not shown in FIG. 6) will pass across the relatively thin bridges 54.

Figure 7:
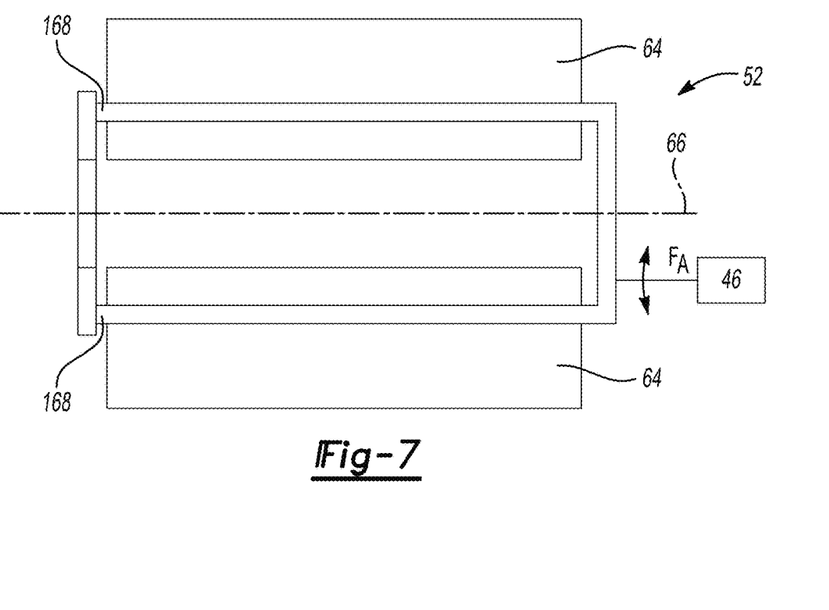
FIG. 7 is a schematic side view illustration of the rotor and a coaxial rotatable element usable with the embodiments shown in FIGS. 5A and 5B.
Figure 8:
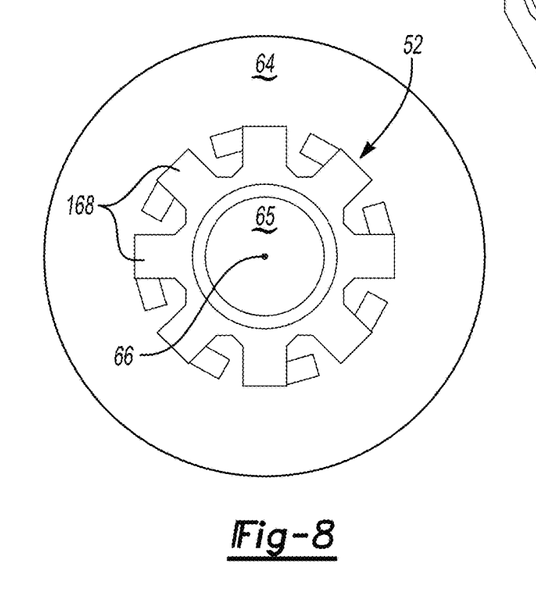
FIG. 8 is a schematic end view illustration of the rotor and coaxial rotatable element shown in FIG. 7.

Referring briefly to FIGS. 7 and 8, actuation of the embodiments shown in FIGS. 5A, 5B, and 6 may be achieved using the coaxial rotatable element 52. The coaxial rotatable element 52 is disposed radially within the rotor 64. Thus, an axis of rotation of the coaxial rotatable element 52 is the same as the axis of rotation 66 of the rotor shaft 65 in this embodiment. The actuator 46 shown in FIG. 7 may deliver the actuation force ($F_A$) to the coaxial rotatable element 52 from one end of the rotor 64 to achieve active flux-shunting, e.g., the positions shown in FIGS. 5A and 6, with a return force biasing the coaxial rotatable element 52 into an inactive flux-shunting position of FIG. 5B.

Referring again briefly to FIGS. 5A and 5B, the depicted embodiment has the benefit of simplicity of design, with the coaxial rotatable element 52 controlling shunting at the inboard ends 17 of the permanent magnets 60. However, laminations of the rotor 64 are typically symmetrical around a perimeter of the rotor 64. Thus, some amount of right-left asymmetry in the laminations may be required for implementation of the actuation embodiment of FIGS. 7 and 8. Implementation of such asymmetry may be less than optimal in terms of magnetic geometry, but may inclusion of geometric asymmetry may simplify mechanical actuation by allowing the configuration of FIGS. 7 and 8 to be used. Flux-shunting in a symmetrical rotor 64, i.e., one in which adjacent poles 15 are identically configured other than having opposite polar orientations, may be achieved on both sides of a typical "V-shaped" pole 15 in various ways, such as by using two counter-rotating/nested elements (not shown).

Figure 9A:
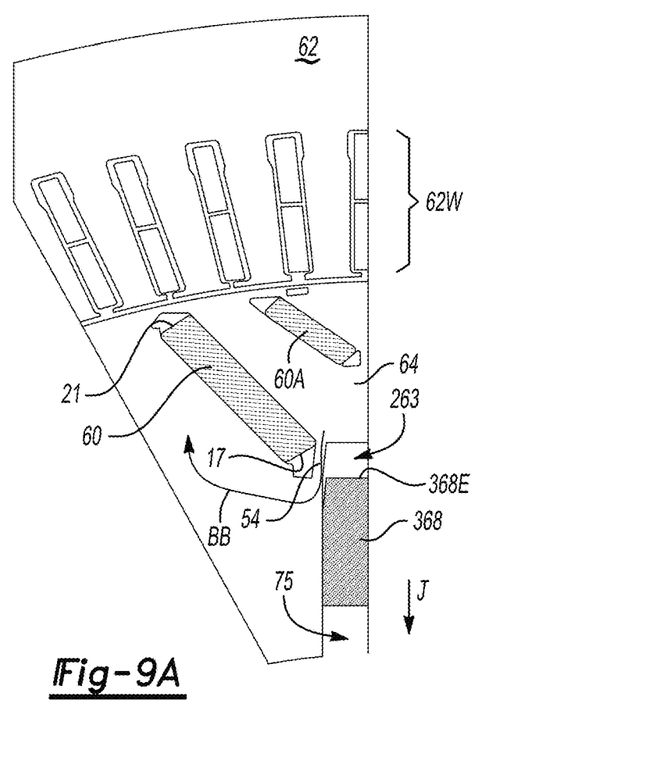
FIGS. 9A and 9B are partial schematic plan view illustrations of the rotor according to another possible embodiment in which the flux-shunting elements are moveable in a radial direction.
Figure 9B:
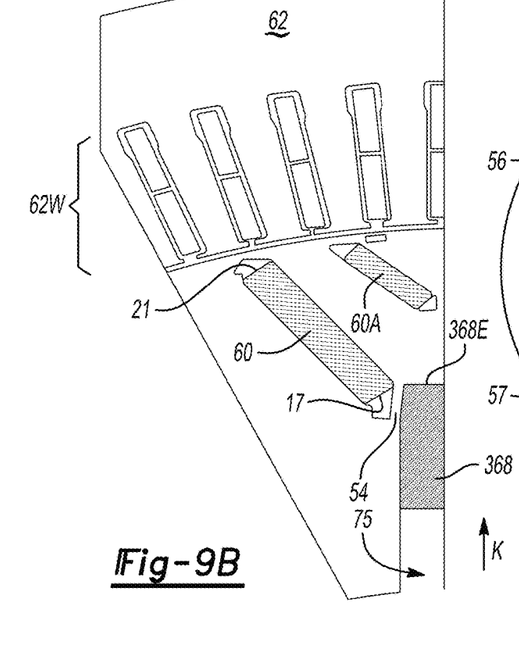

The embodiments explained above vary reluctance via rotation of the flux-shunting elements 68, 168, or 268. Alternatively, the selective flux-shunting effect may be achieved using the structure shown in FIGS. 9A and 9B using alternative flux-shunting elements 368. The flux-shunting elements 368 are configured to translate in a radial slot 75 radially away from the axis of rotation 66 of the rotor 64, as indicated by arrow J in FIG. 9A, so that flux-shunting is inactive, or away from the axis of rotation (arrow K of FIG. 9B) to enable flux-shunting. When flux-shunting is inactive as shown in FIG. 9A, an air pocket 263 defined between an outboard end 368E of the flux-shunting element 368 and the surrounding rotor 64 is opened, leaving a relatively narrow bridge 54 of the rotor 64 as a flux path BB. In contrast, when flux-shunting is active as shown in FIG. 9B, the air pocket 263 is closed by interposition of the flux-shunting element 368. As a result, magnetically permeable material is present immediately adjacent to the respective inboard end 17 of the permanent magnets 60 to carry the magnetic flux, with such material provided by the structure of the flux-shunting elements 368 and the rotor 64.

Figure 10A:
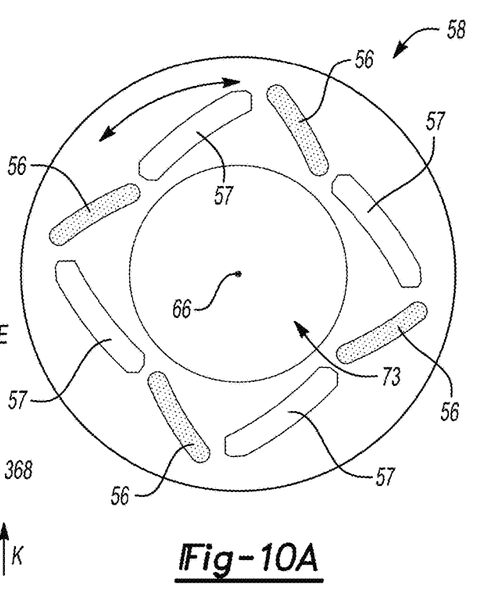
FIGS. 10A, 10B, and 10C are schematic plan view illustrations of a rotatable cam plate usable with the embodiment of FIGS. 9A and 9B.
Figure 10B:
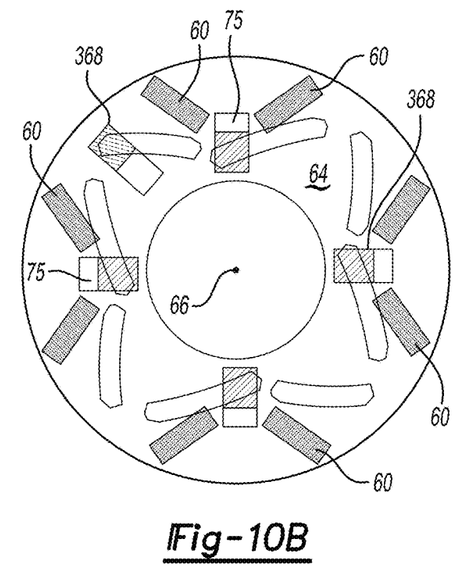
Figure 10C:
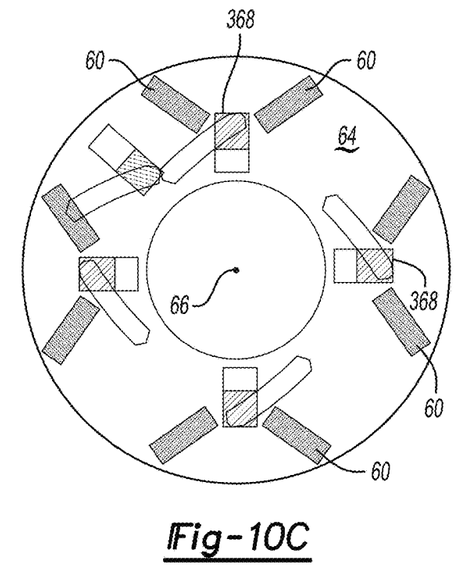

FIGS. 10A-C collectively depicts a possible approach for actuating the flux-shunting elements 368 of FIGS. 9A and 9B. As shown in FIG. 10A, a cam plate 58 with a center through-hole 73 defines a plurality of arcuate through-slots 56 and 57. The rotor shaft 65 is received within the through-hole 73, with the cam plate 58 connected to an identical cam plate (not shown) such that a cam plate 58 is disposed at opposite ends of the rotor 64, e.g., attached to each other by rods. Although omitted for illustrative simplicity, the cam plate 58 may be disposed on a bearing to the rotor shaft 65 to help maintain concentricity. The cam plate 58 is rotatable by the actuator 46 of FIGS. 4 and 7 to translate the flux-shunting elements 368 with respect to the axis of rotation 66, within a respective radial slot 75 of the rotor 64, via contact between a respective arcuate through-slots 56 or 57 and a respective one of the moveable flux-shunting elements 368.

FIG. 10B is achieved by rotating the cam plate 58 of FIG. 10A in a first rotational direction so that flux-shunting is not active, with the plate position of FIG. 10A corresponding to the embodiment of FIG. 9A, e.g., low-speed, or possibly high-speed and high-torque. That is, rotation of the cam plate 58, by virtue of the sliding engagement of the flux-shunting elements 368 in a given one of the slots 56 or 57, translates the flux-shunting elements 268 away from the axis of rotation 66 to open the air pockets 263. To activate flux-shunting, such as under high-speed/low-torque conditions corresponding to zone Z of FIG. 2, the cam plate 58 of FIG. 10A is rotated in the opposite direction, with the slots 56 and 57 guiding the flux-shunting elements 368 away from the axis of rotation 66 and closing the air pockets 263. Such a position corresponds to FIG. 9B.

Figure 11A:
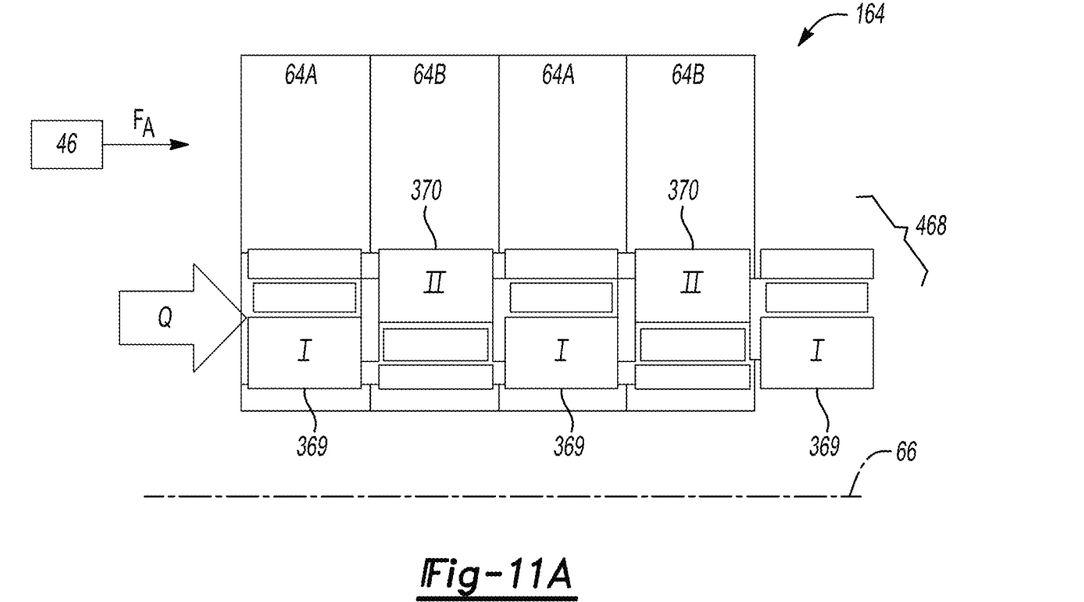
FIGS. 11A and 11B are partial schematic side view illustrations of a segmented rotor having an axis of rotation and flux-shunting segments according to an embodiment in which the flux-shunting segments are translatable parallel to the axis of rotation.
Figure 11B:
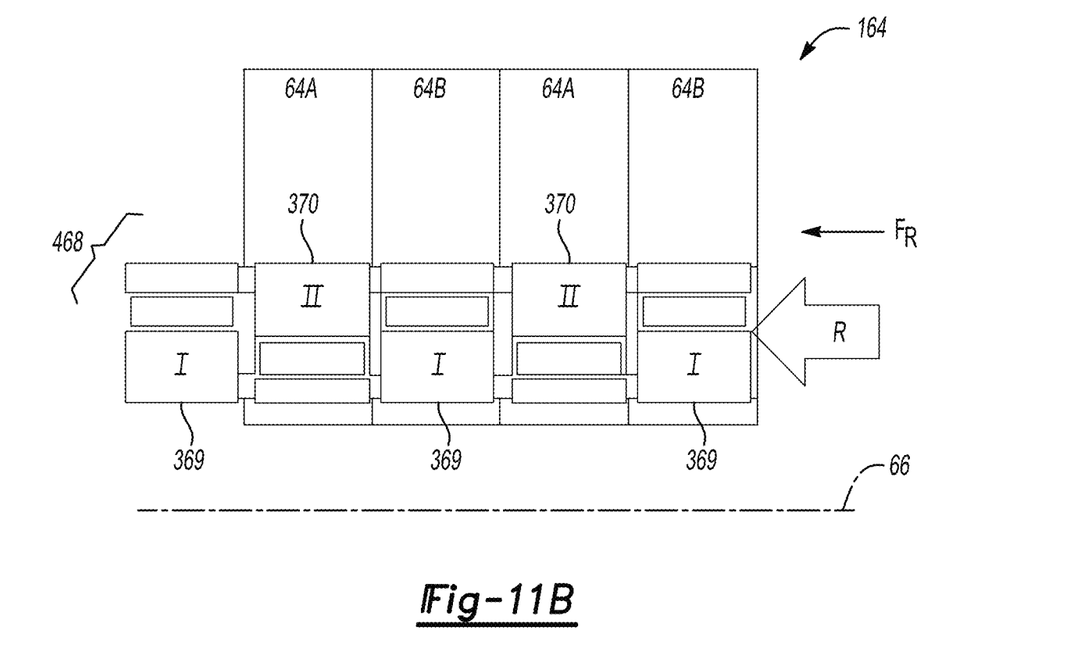

FIGS. 11A and 11B respectively depict a rotor assembly 164 having rotor segments 64A and 64B and an axially-segmented flux-shunting element 468. The rotor segments 64A and 64B may be constructed of separate laminations, e.g., 25 to 50 individual laminations, each of about 10-20 mm thick in some embodiments. The axially-segmented shunting element 468 is translatable along the axis of rotation 66 in the direction of arrow Q to provide active flux-shunting (FIG. 11A), or in the opposite direction of arrow R when flux-shunting is not desired (FIG. 11B). An actuation force ($F_A$) may be applied to a distal end of the axially-segmented shunting element 468 to translate the axially-segmented shunting element 468 a distance sufficient to align a first set (I) of identically-configured flux-shunting segments 369 with the rotor segments 64A, and a second set (II) of identically-configured flux-shunting segments 370 with the rotor segments 64B. When flux-shunting is not desired, the actuation force (arrow $F_A$) may be discontinued, and a return force (arrow FR) thus urges the axially-segmented shunting element 468 such that the first set (I) of identically-configured flux-shunting segments 369 are aligned with rotor segments 64B and the second set (II) of identically-configured flux-shunting segments 370 are aligned with the rotor segments 64A.

Figure 12A:
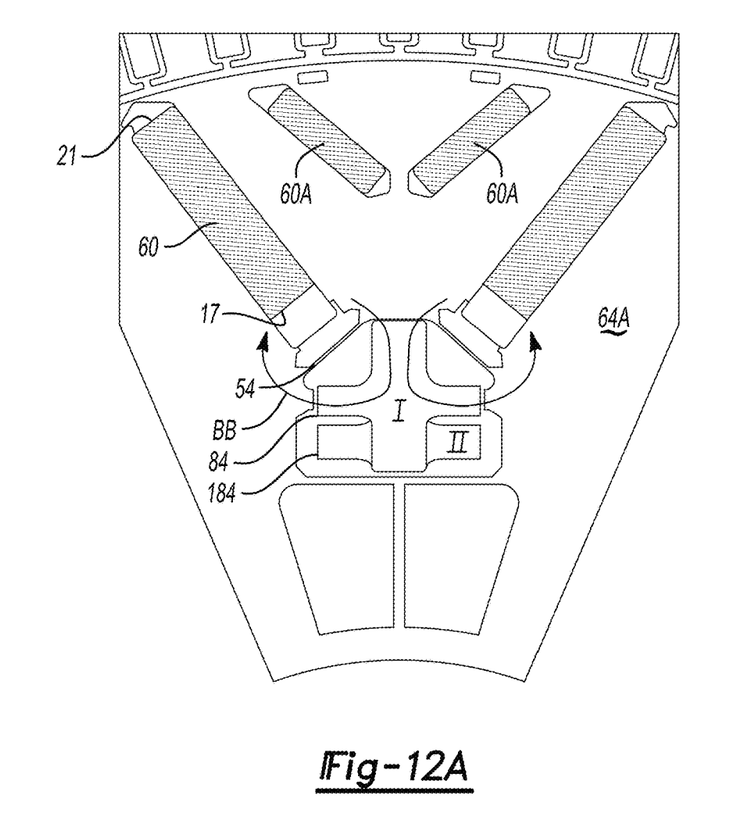
FIGS. 12A, 12B, 12C, and 12D are partial schematic plan view illustrations of a representative pole of the rotor according to the embodiment of FIGS. 11A and 11B.
Figure 12B:
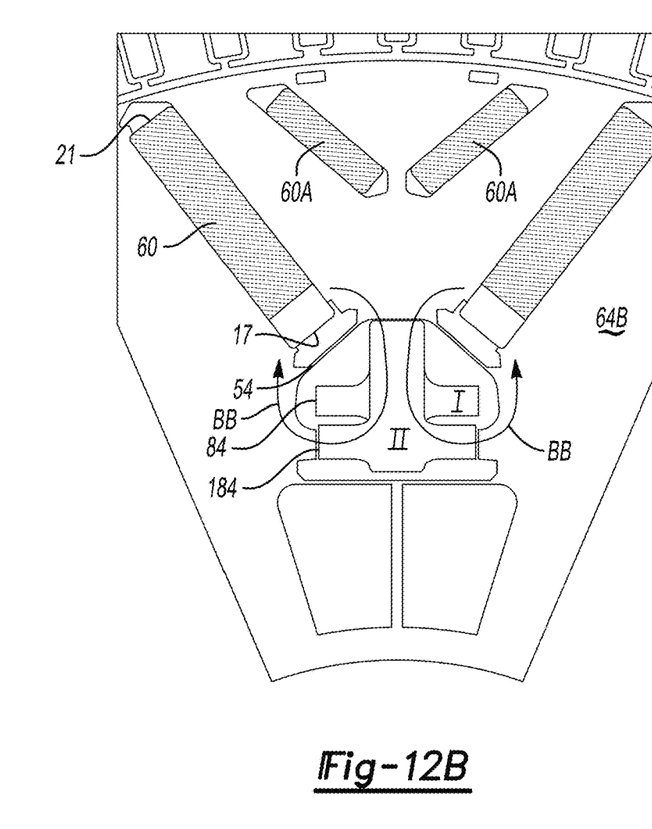

To enable the embodiment of FIGS. 11A and 11B, the rotor 64 is provided with differently-configured alternating adjacent segments 64A and 64B. FIGS. 12A and 12B depict a possible example configuration of the rotor segments 64A and 64B in an actively shunted position corresponding to FIG. 11A, with the flux-shunting segments 369 shown in-plane and the flux-shunting segments 370 shown out-of-plane. The first and second sets (I and II) of identically-configured flux-shunting segments 369 and 370 may be axial cross-shaped or T-shaped members as shown. Other embodiments may use differently-shaped flux-shunting segments 369 and 370, e.g., L-shaped, with the particular shape being such that flux-shunting is enabled in one axial direction and disabled or inactivated in the other axial direction. In the depicted example configuration, the arms 84, 184 of the flux-shunting segments 369 and 370 may, in the active flux-shunting positions of FIGS. 12A and 12B, extend to a position immediately adjacent to bridges 54, i.e., an air pocket 463 (see FIG. 12C) between the arms 84 and 184 and the bridges 54 is effectively closed in the active shunting position of FIGS. 12A and 12B.

Figure 12C:
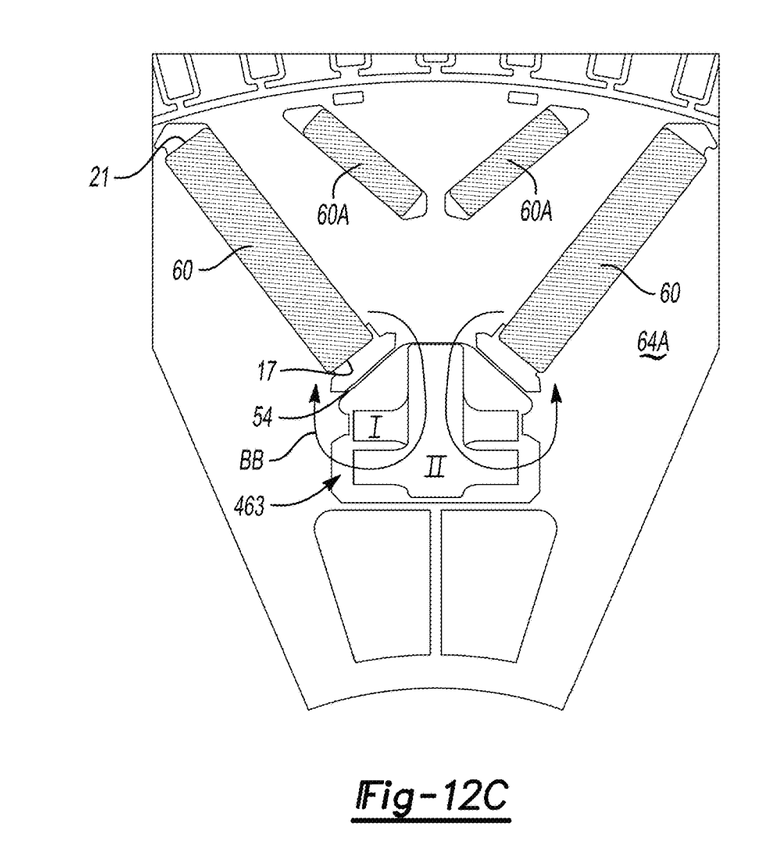
Figure 12D:
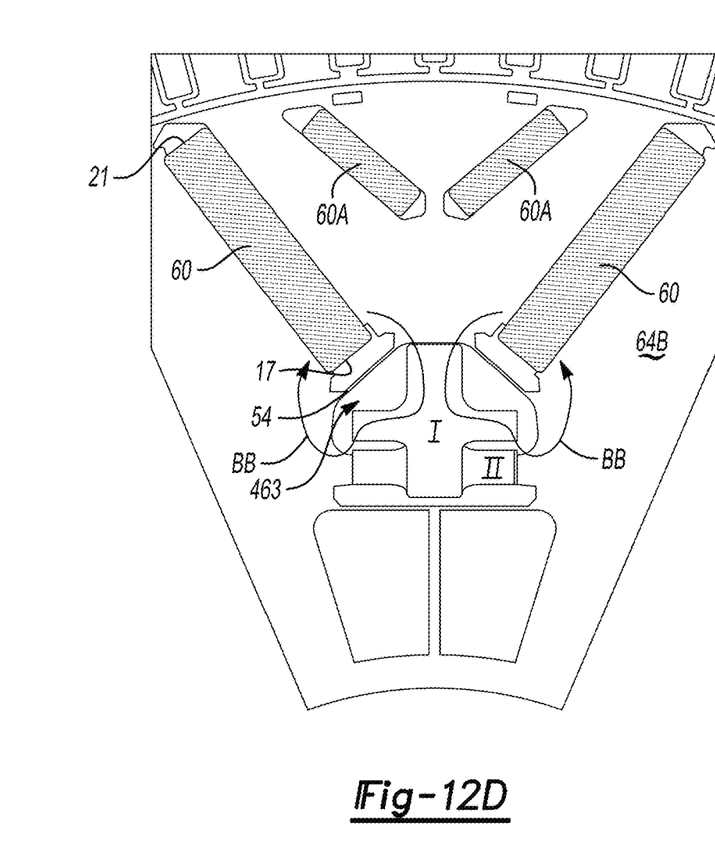

When active flux-shunting is no longer required, the position of FIG. 11B is established via the return force (arrow FR of FIG. 11B), which urges the axially-segmented shunting element 468 in the direction of arrow R in the perspective of FIG. 11B. That is, the first and second sets (I and II) of identically-configured flux-shunting segments 369 and 370 align with rotor segments 64B and 64A, respectively, such that magnetic flux is reduced. FIGS. 12C and 12D depict rotor segments 64A and 64B, respectively. The air pocket 463 between the bridges 54 and the adjacent first and second sets (I and II) of identically-configured flux-shunting segments 369 and 370 noted above as being closed in FIGS. 12A and 12B is thus opened in FIGS. 12C and 12D. As a result, flux shunting is rendered inactive, as flux must now pass around the enlarged air pocket 463.

The disclosed moveable flux-shunting elements 68 in the various above-described embodiments of FIGS. 3A-12D may therefore be used to vary reluctance in the region of the rotor assembly 61 nearest the inboard ends 17 of the permanent magnets 60. In this manner, the present disclosure enables active control of the field of the PM machine 16 of FIG. 1 with an associated reduction of losses, particularly at high-speed/low-torque operating points.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes any and all combinations and subcombinations of the elements and features presented above and below.

What is claimed:

1. A permanent magnet (PM) electric machine, comprising:
    a rotor assembly including a rotor rotatable about a rotor axis, and a rotor shaft coaxial with and coupled to the rotor;
    a plurality of permanent magnets fixed to the rotor;
    a stator positioned adjacent to the rotor assembly and forming a magnetic circuit with the permanent magnets and the rotor; and
    a flux-shunting element rotatably mounted to the rotor radially inward of the permanent magnets, the flux-shunting element including a material with a magnetic permeability configured to vary a reluctance in the magnetic circuit and thereby direct magnetic flux from the permanent magnets in a plane transverse to the rotor axis in response to selective rotation of the flux-shunting element from an inactive non-shunting position to an active shunting position.

2. The PM electric machine of claim 1, wherein the rotor assembly is rotatable within a center cavity of a stator core of the stator, wherein each of the permanent magnets is rigidly mounted to the rotor with an inboard end thereof oriented towards the rotor shaft and an outboard end thereof oriented towards the stator core, and wherein the flux-shunting element is rotatably mounted to the rotor adjacent the inboard ends of the permanent magnets.

3. The PM electric machine of claim 1, wherein the flux-shunting element is rotatable about a shunt axis that is parallel to and radially spaced from the rotor axis.

4. The PM electric machine of claim 1, wherein the flux-shunting element is formed with first and second materials having distinct first and second magnetic permeabilities, respectively, and wherein the first material is a non-magnetic or a paramagnetic material, and the second material is a ferromagnetic material.

5. The PM electric machine of claim 4, wherein the flux-shunting element is constructed of joined first and second halves, the first half being formed from the first material having the first relative magnetic permeability, and the second half being formed from the second material having the second relative magnetic permeability.

6. The PM electric machine of claim 1, wherein the rotor defines therein a plurality of axially elongated slots, and wherein the flux-shunting element includes a plurality of flux-shunting elements each rotatably mounted within a respective one of the axially elongated slots of the rotor.

7. The PM electric machine of claim 6, wherein the axially elongated slots are arcuate, and wherein the flux-shunting elements are rotatable within the axially elongated slots about the rotor axis of the rotor.

8. The PM electric machine of claim 1, further comprising:
    a rotatable cam plate positioned adjacent to the rotor assembly and defining an arcuate slot within which is received an end of the flux-shunting element; and
    an actuator operable to rotate the cam plate to thereby move the flux-shunting element within the arcuate slot from the inactive non-shunting position to the active shunting position.

9. The PM electric machine of claim 1, further comprising:
    a rotary or linear actuator configured to impart an actuating force to selectively rotate the flux-shunting element from the inactive non-shunting position to the active shunting position responsive to an electronic control signal; and
    a controller in communication with the rotary or linear actuator and configured to output the electronic control signal to the rotary or linear actuator.

10. The PM electric machine of claim 1, further comprising a passive actuator with a coil spring assembly configured to apply a spring force to the flux-shunting element to thereby rotate the flux-shunting element to the inactive non-shunting position at low-speed and high-torque of the PM machine, and configured to compress due to centripetal acceleration of the rotor at high-speed and low-torque of the PM machine and thereby allow the flux-shunting element to rotate to the active shunting position.

11. The PM electric machine of claim 1, further comprising a plurality of rotatable torque transfer elements, wherein the flux-shunting element incudes a plurality of flux-shunting elements each mounted to or formed integrally with a respective one of the rotatable torque transfer elements.

12. The electric PM machine of claim 11, further comprising:
a gear set having multiple pinion gears rotatably engaged with a sun gear, each of the pinion gears being connected to or formed integrally with a respective one of the torque transfer elements; and
an actuator configured to rotate the sun gear.

13. A vehicle comprising:
a vehicle body;
a plurality of drive wheels rotatably mounted to the vehicle body;
a transmission with an input member and an output member, the output member being drivingly connected to one or more of the drive wheels; and
a permanent magnet (PM) electric machine coupled to the input member and configured to deliver torque to the transmission, the PM electric machine including:
a rotor assembly with a rotor rotatable about a rotor axis, and a rotor shaft coaxial with and coupled to the rotor;
a plurality of permanent magnets fixed to the rotor;
a stator positioned adjacent to the rotor assembly and forming a magnetic circuit with the permanent magnets and the rotor; and
a flux-shunting element rotatably mounted to the rotor radially inward of the permanent magnets, the flux-shunting element including a material with a magnetic permeability configured to vary a reluctance in the magnetic circuit and thereby direct magnetic flux from the permanent magnets in a plane transverse to the rotor axis in response to selective rotation of the flux-shunting element from an inactive non-shunting position to an active shunting position.

14. The vehicle of claim 13, wherein the flux-shunting element is rotatable about a shunt axis that is coincident with or parallel to the rotor axis of the rotor.

15. The vehicle of claim 13, wherein the flux-shunting element is formed with first and second materials having distinct first and second magnetic permeabilities, respectively, and wherein the first material is a non-magnetic or a paramagnetic material, and the second material is a ferromagnetic material.

16. The vehicle of claim 13, wherein the rotor assembly is rotatable within a center cavity of a stator core of the stator, wherein each of the permanent magnets is rigidly mounted to the rotor with an inboard end thereof oriented towards the rotor shaft and an outboard end thereof oriented towards the stator core, and wherein the flux-shunting element is rotatably mounted to the rotor adjacent the inboard ends of the permanent magnets.

17. The vehicle of claim 13, wherein the rotor defines therein a plurality of axially elongated slots, and wherein the flux-shunting element includes a plurality of flux-shunting elements each rotatably mounted within a respective one of the axially elongated slots of the rotor.

18. The vehicle of claim 13, further comprising:
a rotary or linear actuator configured to impart an actuating force to selectively rotate the flux-shunting element from the inactive non-shunting position to the active shunting position responsive to an electronic control signal; and
a controller in communication with the rotary or linear actuator and configured to output the electronic control signal to the rotary or linear actuator.

19. The vehicle of claim 13, further comprising a passive actuator with a coil spring assembly configured to apply a spring force to the flux-shunting element to thereby rotate the flux-shunting element to the inactive non-shunting position at low-speed and high-torque of the PM machine, and configured to compress due to centripetal acceleration of the rotor at high-speed and low-torque of the PM machine and thereby allow the flux-shunting element to rotate to the active shunting position.

20. An electric motor comprising:
a stator assembly including a stator core and a plurality of electrically conductive windings, the stator core defining a center cavity and a plurality of stator slots, the electrically conductive windings being mounted within the stator slots;
a rotor assembly rotatably mounted inside the center cavity concentric with the stator core, the rotor assembly including a rotor rotatable about a rotor axis, and a plurality of permanent magnets rigidly mounted to the rotor and forming a magnetic circuit with the stator assembly; and
a plurality of flux-shunting elements moveably mounted to the rotor radially inward of the permanent magnets, each of the flux-shunting elements including a material with a magnetic permeability configured to vary a reluctance in the magnetic circuit and thereby direct magnetic flux from the permanent magnets in a plane transverse to the rotor axis in response to selective rotation of the flux-shunting element from an inactive non-shunting position to an active shunting position.

* * * * *